UNITED STATES PATENT OFFICE.

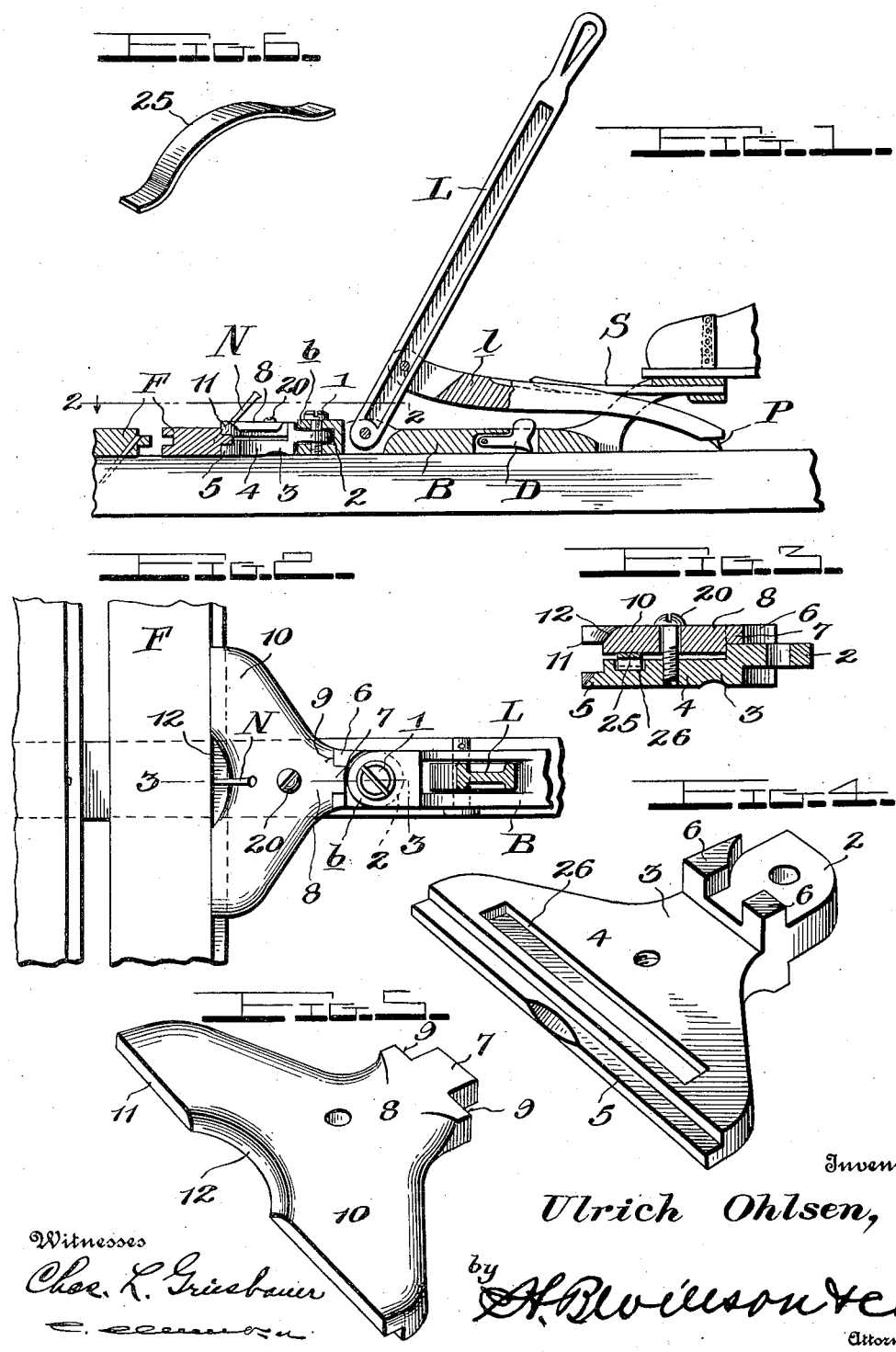

ULRICH OHLSEN, OF DENVER, COLORADO, ASSIGNOR OF ONE-HALF TO MARTIN MORTENSEN, OF DENVER, COLORADO.

FLOORING-TOOL.

1,153,106.  Specification of Letters Patent.  Patented Sept. 7, 1915.

Application filed January 25, 1915. Serial No. 4,266.

*To all whom it may concern:*

Be it known that I, ULRICH OHLSEN, a citizen of the United States, residing at Denver, in the county of Denver and State of Colorado, have invented certain new and useful Improvements in Flooring-Tools; and I do declare the following to be a full, clear, and exact description of the invention such as will enable others skilled in the art to which it appertains to make and use the same.

My invention relates broadly to improvements in flooring tools and has for its object to improve the construction of the device shown in my allowed U. S. Patent 1,106,399, patented Aug. 11, 1914. The device covered by this patent was found to be a very efficient tool when laying but one thickness of floor, but since the groove 12 in the head 10 was of only a predetermined width, the tool would not operate upon thicker flooring or upon flooring having tongues of greater thickness. The invention therefore aims to overcome this difficulty by providing a pair of jaw plates movable toward and away from each other, and to provide certain novel structural details for accomplishing this result.

With the above in view, the invention resides in numerous novel features of construction and combination hereinafter described and claimed and shown in the drawings wherein:

Figure 1 is a side elevation partly in section showing the application of the improved tool to use; Fig. 2 is a horizontal section as seen along the plane of the line 2—2 of Fig. 1; Fig. 3 is an enlarged detail longitudinal section taken along the plane of the line 3—3 of Fig. 2, the head being considered as removed from the remainder of the tool; Figs. 4 and 5 are perspective views respectively of the lower and upper jaw plates, and Fig. 6 is a similar view of the spring which is interposed between these two plates.

In these drawings, constituting a part of this application, a longitudinally extending bar B is shown as having its front end bifurcated as seen at $b$, while its rear end is turned upwardly and equipped with a spring S, the intermediate portion of said bar B being recessed and carrying a pronged dog D. Pivoted to and rising from the forward portion of the bar B is an operating lever L to whose lower end a link $l$ is pivoted, this link extending rearwardly from the lever L, beneath the spring S, and having a prong P on its rear end.

The construction so far briefly described, is clearly illustrated and described in detail in the patent above referred to, it being therefore obvious that such structure forms no part of the present invention and that further description and illustration thereof is therefore unnecessary.

Pivoted within the bifurcation $b$ of the bar B upon an upright screw or pivot pin 1, is an ear 2 which is formed on the rear end of a neck 3, this neck extending rearwardly from a lower horizontally disposed jaw plate 4, which plate is here shown as of substantially triangular formation and as having a straight active front edge 5 suitably designed to abut one edge of the flooring board F and to partially receive the tongue T thereof (see more particularly Fig. 1).

At the juncture of the ear 2 and neck 3, or in other words substantially at the rear edge of the plate 4, the latter is provided with a pair of upstanding transversely alined lugs or shoulders 6. Under normal conditions, when the tool is assembled, an additional lug 7 which if formed on the rear end of a neck 8, is positioned between the two lugs 6, said additional lug 7 being of less width than the neck 8 whereby to provide a pair of shoulders 9 abutting the front faces of the lugs 6, whereby forward movement of the plate 4 and these lugs, will force the neck 8 forwardly, thus also actuating an additional jaw plate 10 upon which said neck 8 is formed. As most clearly seen in Figs. 2 and 5, the plate 10 is of substantially the same form as the plate 4 and is provided with an active front edge 11 which is suitably designed to abut the edge of the flooring board and to receive the remainder of the tongue thereof. The center of this edge 11 is here shown as provided with a notch 12 whereby no interference is encountered when driving the nails N into the flooring boards.

For the purpose of moving the upper plate 10 toward the lower plate 4, I preferably provide an upright screw 20, the upper portion of this screw being passed loosely through an opening in the plate 10, while its lower end is threaded into an opening formed in the lower plate 4. By this structure, it will be seen that rotation of the screw in the proper direction will force the two plates toward each other. On the other hand, if this screw is rotated in the opposite direction, an arched leaf spring 25 which is interposed between the two jaw plates and disposed in a recess 26 in the plate 4, will move said plates away from each other. It will therefore be seen that the head composed of the two jaw plates, may readily be adjusted for rendering it applicable to flooring boards of different thicknesses.

Particular emphasis is laid upon the fact that the lowermost plate 4 is provided with the shoulders 6, or with equivalent stops, and that the upper plate 10 is provided with portions which abut these shoulders, since by this construction, projecting of the lower plate, will through the instrumentality of the shoulders 6, project the upper plate, said shoulders thereby relieving all strain from the screw 20.

From the foregoing description, taken in connection with the accompanying drawings, it will be seen that a very simple yet highly efficient tool has been provided for carrying out the object of the invention, yet that such tool may be inexpensively manufactured and marketed. Furthermore, it will be clear to those skilled in the art, that practically a hinged connection is provided between the two plates 4 and 10, the lugs 6 and 7 serving as coacting hinge members, and that it is clearly within the scope of the present invention to provide any type of hinge for connecting the two plates.

I claim:

A tool comprising a head including a jaw plate having an active front edge designed to abut a board, a pair of lugs projecting from one face of said plate and disposed near the rear edge thereof, an additional jaw plate contiguous to said one face of the other plate and having portions bearing against the front sides of the lugs thereon, and an additional lug on the additional plate and projecting between the other lugs, combined with means to move the two plates toward and away from each other, and additional means for projecting the head.

In testimony whereof I have hereunto set my hand in presence of two subscribing witnesses.

ULRICH OHLSEN.

Witnesses:
FRED L. NELSON,
NIELS HEINRICHSEN.

Copies of this patent may be obtained for five cents each, by addressing the "Commissioner of Patents, Washington, D. C."